(12) United States Patent
Palmer

(10) Patent No.: US 12,345,205 B2
(45) Date of Patent: Jul. 1, 2025

(54) HYDROGEN-FUELLED GAS TURBINE ENGINE WITH FUEL-TO-AIR TURBOCHARGER

(71) Applicant: ROLLS-ROYCE plc, London (GB)

(72) Inventor: Chloe Jo Palmer, Derby (GB)

(73) Assignee: Rolls-Royce plc

( * ) Notice: Subject to any disclaimer, the term of this patent is extended or adjusted under 35 U.S.C. 154(b) by 142 days.

(21) Appl. No.: 18/310,747

(22) Filed: May 2, 2023

(65) Prior Publication Data
US 2023/0383694 A1    Nov. 30, 2023

(30) Foreign Application Priority Data
May 30, 2022   (GB) ..................... 2207929

(51) Int. Cl.
| | |
|---|---|
| *F02C 7/224* | (2006.01) |
| *B64D 13/08* | (2006.01) |
| *B64D 15/04* | (2006.01) |
| *B64D 37/30* | (2006.01) |
| *B64D 37/34* | (2006.01) |
| *F02C 3/06* | (2006.01) |
| *F02C 3/22* | (2006.01) |

(52) U.S. Cl.
CPC ............. *F02C 7/224* (2013.01); *B64D 13/08* (2013.01); *B64D 15/04* (2013.01); *B64D 37/30* (2013.01); *B64D 37/34* (2013.01); *F02C 3/06* (2013.01); *F02C 3/22* (2013.01)

(58) Field of Classification Search
CPC ... F02C 7/224; F02C 3/06; F02C 3/22; B64D 13/08; B64D 15/04; B64D 37/30; B64D 37/34
See application file for complete search history.

(56) References Cited

U.S. PATENT DOCUMENTS

2016/0123226 A1   5/2016   Razak et al.
2021/0340908 A1*  11/2021  Boucher .................. F02C 7/224

FOREIGN PATENT DOCUMENTS

| CN | 107989699 A * | 5/2018 | ............... F02C 7/12 |
| EP | 3855002 A2 | 7/2021 | |

(Continued)

OTHER PUBLICATIONS

Great Britain search report dated Nov. 28, 2022 issued in Great Britain patent application No. 2207929.7.

(Continued)

*Primary Examiner* — Steven M Sutherland
(74) *Attorney, Agent, or Firm* — Barnes & Thornburg

(57) ABSTRACT

A hydrogen-fuelled gas turbine engine has a fuel input path from a fuel input of the engine to a combustor, the engine further comprising a heat-exchanger located in the fuel input path and a fuel turbine located in the fuel input path between the heat-exchanger and the combustor. The heat-exchanger is arranged to receive waste heat from the engine core in order to heat hydrogen fuel introduced at the fuel input prior to input thereof to the combustor. The engine further comprises an air compressor arranged to be driven by the fuel turbine. The engine provides for most of the waste heat of combustion to be recovered and used without the need for heavy electrical or mechanical apparatus and is therefore particularly advantageous in aeronautical applications.

18 Claims, 3 Drawing Sheets

(56) References Cited

FOREIGN PATENT DOCUMENTS

| EP | 3904658 | A1 | 11/2021 |
| EP | 3943732 | A1 | 1/2022 |
| EP | 3978738 | A1 | 4/2022 |
| EP | 3978807 | A2 | 4/2022 |

OTHER PUBLICATIONS

European search report dated Oct. 19, 2023, issued in EP Patent Application No. 23170953.6.

* cited by examiner

HYDROGEN-FUELLED GAS TURBINE ENGINE WITH FUEL-TO-AIR TURBOCHARGER

CROSS-REFERENCE TO RELATED APPLICATIONS

This specification is based upon and claims the benefit of priority from United Kingdom patent application number GB 2207929.7 filed on May 30, 2022, the entire contents of which is incorporated herein by reference.

BACKGROUND

Technical Field

The disclosure relates to hydrogen-fuelled gas turbine engines and to aircraft comprising such engines.

Description of the Related Art

Waste heat generated within, and output by, the core of a hydrogen-fuelled gas turbine engine during its operation represents in theory an opportunity for recovery of large amounts of power which might be used to improve engine efficiency, or to provide power for use at the airframe level in the case of aeronautical applications. In the case of a large civil aero engine, potentially more than 5 MW might be available to be recovered. However, whilst very large amounts of power might be recovered in theory, the handling and use of large amounts of recovered power presents a technical challenge in terms of harnessing the recovered power in the most effective way possible, especially in aeronautical applications. For example, in the case of conversion of recovered heat to electrical power, a 5 MW electrical generator might have a mass of between 250 kg and 500 kg (based on typical power densities in the range 10-20 kW/kg) and such conversion would also require associated power electronics (125-200 kg), large cables, as well as means for using the electrical power. Thus, conversion of large amounts of recovered heat to purely electrical power is not likely to be practical in aeronautical applications. Conversion of waste heat to purely mechanical power which is then input to a shaft of the engine is another possibility but would also have an unacceptable weight penalty in aeronautical applications due to the weight of mechanical gearing that would be required.

SUMMARY

A first aspect of the disclosure provides a hydrogen-fuelled gas turbine engine having a fuel input path from a fuel input of the engine to a combustor thereof, the engine further comprising a heat-exchanger located in the fuel input path and a fuel turbine located in the fuel input path between the heat-exchanger and the combustor, wherein the heat-exchanger is arranged to receive waste heat from the engine core in order to heat hydrogen fuel introduced at the fuel input prior to input thereof to the combustor, the engine further comprising an air compressor arranged to be driven by the fuel turbine. The engine allows the energy of waste heat generated during its operation to be recovered and used without the need for heavy electrical of mechanical apparatus. An engine of the disclosure is therefore particularly advantageous in aeronautical applications.

The heat-exchanger may be a recuperator arranged to receive combustion gases output from the turbine section of the engine.

The engine may further comprise a second heat-exchanger located in the fuel input path between the recuperator and the fuel turbine, the second heat-exchanger being physically disposed between first and second compressor stages of the engine, the first compressor stage being located upstream of the second compressor stage, and the recuperator being arranged to heat hydrogen fuel introduced at the fuel input to a temperature below the discharge temperature of the first compressor stage.

The engine may further comprise a third heat-exchanger, the third heat-exchanger being a second recuperator located in the fuel input path between the second heat-exchanger and the fuel turbine, the second recuperator being physically located between the turbine section of the engine and the first recuperator and arranged to receive combustion gases output from the turbine section of the engine.

The engine may further comprise a heat exchanger arranged to transfer heat from air output by the air compressor to gaseous hydrogen fuel introduced at the fuel input prior to input of the gaseous hydrogen fuel to the combustor.

The engine may be a turbofan engine, a turboprop engine, a turboshaft engine or a turbojet engine.

A second aspect of the disclosure provides an aircraft comprising an engine according to the first aspect, the engine being arranged to provide at least one of propulsive thrust and lift to the aircraft, the aircraft further comprising air flow ducting arranged to deliver air output by the air compressor to one or more parts of the aircraft and an air scooping arrangement arranged to direct ambient air to the air compressor in operation of the aircraft.

The airflow ducting may be arranged to deliver air output by the air compressor to one or more of an engine cowling, an engine nacelle, a pylon, a wing and the fuselage of the aircraft.

The air flow ducting may be arranged to provide air for boundary layer disruption at one or more surfaces of the aircraft.

The air flow ducting may be arranged to provide air for de-icing of one or more surfaces of the aircraft, for example a wing surface of a wing of the aircraft.

The aircraft may further comprise an air turbine, the air flow ducting being arranged to deliver air output by the air compressor to the air turbine.

A portion of the air flow ducting may be arranged to deliver air output from the air turbine to one or more or systems of the aircraft requiring cooling during operation of the aircraft, for example one or more of an electronic system, an environmental control system, an actuation system and an engine oil system of the aircraft.

The air flow ducting may be arranged to deliver air output from the air compressor to a pneumatic system of the aircraft. The pneumatic system may be arranged to control variable stator vanes of the engine.

The air flow ducting may be arranged to deliver air output by the air compressor to at least one of an environmental control system of the aircraft and a cabin or cockpit of the aircraft to provide heat to the environmental control system, or to the cockpit or cabin, as the case may be.

The aircraft may further comprise a store of liquid hydrogen, a vaporiser arranged to vaporise liquid hydrogen from the store to produce gaseous hydrogen fuel for input to the fuel input of the engine, the aircraft further comprising a heat exchanger arranged to transfer heat from the vaporiser to gaseous hydrogen fuel introduced at the fuel input prior to input of the gaseous hydrogen fuel to the combustor of the engine.

The engine, or the aircraft, may further comprise an electric generator arranged to be driven by the air compressor 261.

DESCRIPTION OF THE DRAWINGS

Embodiments of the disclosure are described below by way of example only and with reference to the accompanying drawings in which.

DETAILED DESCRIPTION

Figure 1:
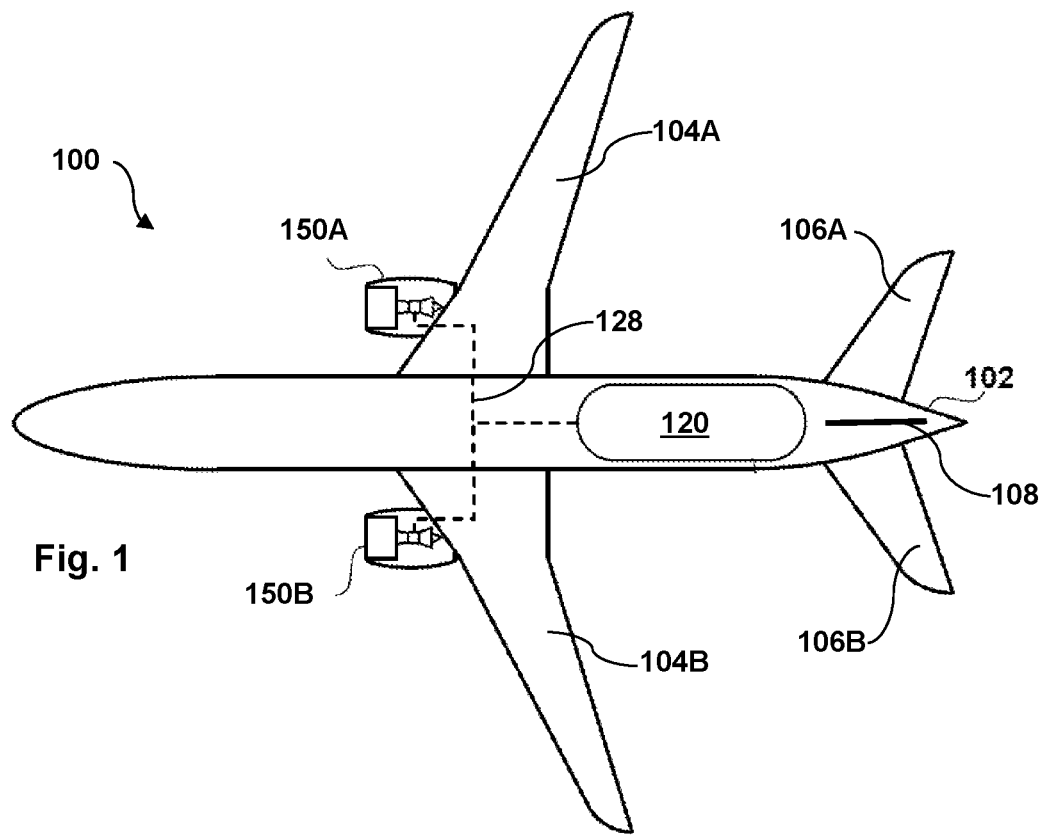
FIG. 1 shows an aircraft.

FIG. 1 shows a plan view of an aircraft 100, the aircraft 100 comprising a fuselage 102, wings 104A, 104B, horizontal stabilisers 106A, 106B, a vertical stabiliser 108, a fuel system 120, a fuel supply network 128 and first and second hydrogen-fuelled turbofan engines 150A, 150B mounted under wings 104A, 104B respectively. The stabilisers 106A, 106B, 108 and the wings 104A, 104 comprise elevators, a rudder and ailerons respectively which are not shown separately in FIG. 1.

Figure 2:
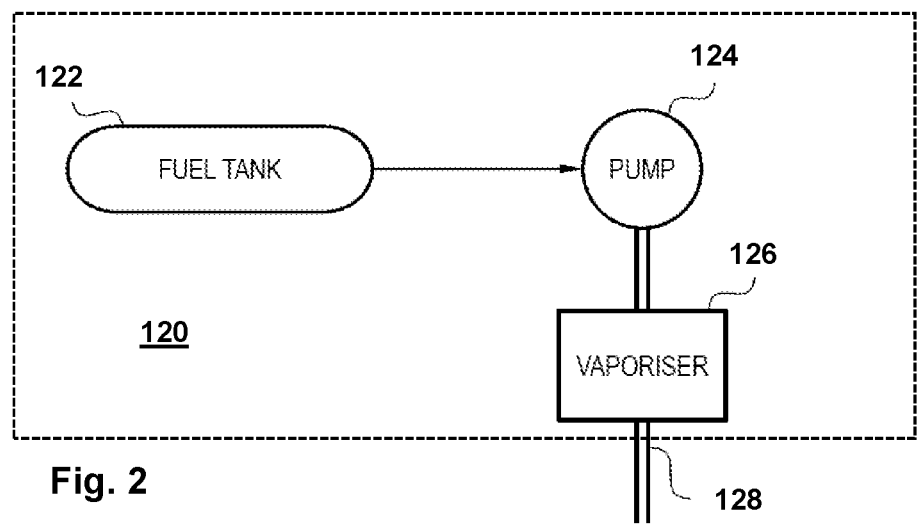
FIG. 2 shows a fuel system of the FIG. 1 aircraft.

FIG. 2 shows the fuel system 120 of the aircraft 100 in detail. The fuel system 120 comprises a cryogenic fuel tank 122 storing liquid hydrogen fuel, a pump 124 and a vaporiser 126. The pump 126 is arranged to pump liquid hydrogen to the vaporiser 126 which converts the liquid hydrogen fuel to gaseous hydrogen fuel. The gaseous hydrogen fuel is provided to the hydrogen-fuelled turbofan engines 150A, 150B via the fuel supply network 128. The vaporiser 126 may for example be of a type described in published European Patent Application EP3978738A1. The hydrogen-fuelled turbofan engines 150A, 150B are identical.

Figure 3:
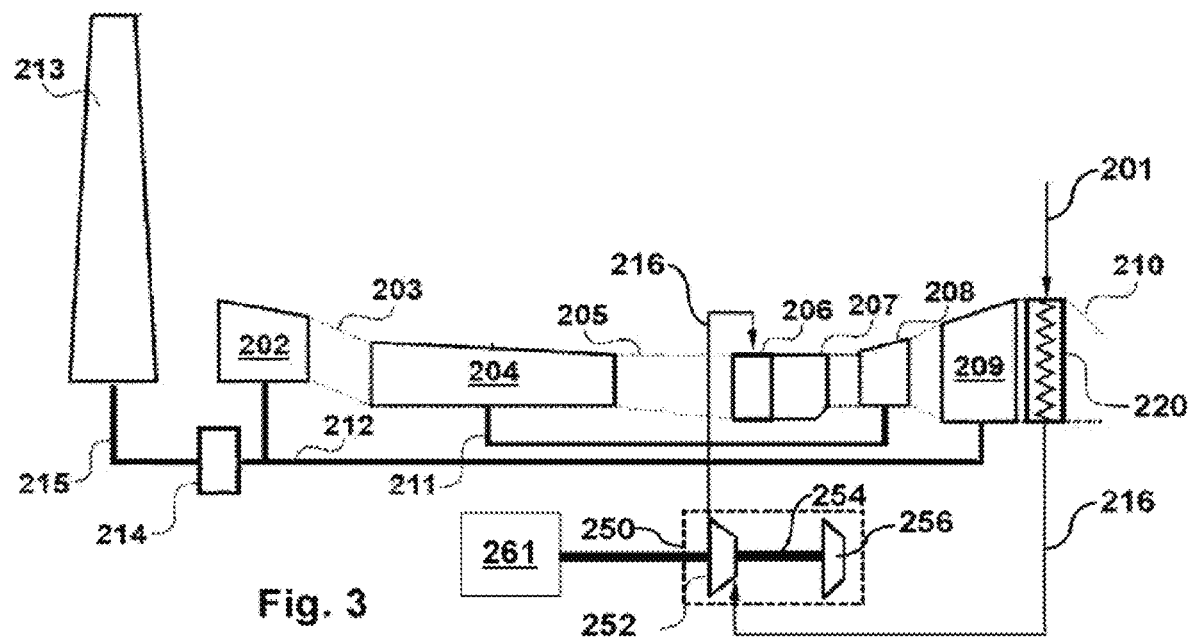
FIG. 3 shows part of a hydrogen-fuelled turbofan engine comprised in the FIG. 1 aircraft.

FIG. 3 shows part of the first hydrogen-fuelled turbofan engine 150A. The first turbofan engine 150A comprises a propulsive fan having fan blades such as 213, a high-pressure compressor 202, an inter-stage duct 203, a low-pressure compressor 204, a diffuser 205, a fuelling system 206, a hydrogen combustor 207, a high-pressure turbine 207, a low-pressure turbine 209 and a core exit nozzle 210. The high-pressure compressor 204 and the high-pressure turbine 208 are mounted on a high-pressure shaft 211; the low-pressure compressor 202 and the low-pressure turbine 209 are mounted on a low-pressure shaft 212. The low-pressure shaft 212 is mechanically coupled to the input of a reduction gear 214; a fan shaft 215 mounts the fan and is mechanically coupled to the output of the reduction gear 214.

The first turbofan engine 150A further comprises a fuel line 216 which provides a fuel input path from a fuel input 201 of the first turbofan engine 150A to the combustor 207 thereof, the fuel input path including a recuperator 220 and a fuel turbine 252, the fuel turbine 252 being located in the fuel input path between the recuperator 220 and the combustor 207. The recuperator 220 is physically located to receive gaseous combustion products output from the turbine section of the engine 150A, the turbine section comprising the high- and low-pressure turbines 208, 209. The fuel turbine 252 is comprised in a fuel-to-air turbocharger 250 which further comprises an air compressor 256 arranged to be driven by the fuel turbine 252. The air compressor 256 is separate to the compressors 202, 204 of the gas turbine engine, and does not communicate with core gas turbine flow. The air compressor 256 is also decoupled from the core shafts 211, 212. Optionally, the turbocharger 250 may include an electrical generator (not shown) arranged to be driven by the air compressor 256.

Figure 4:
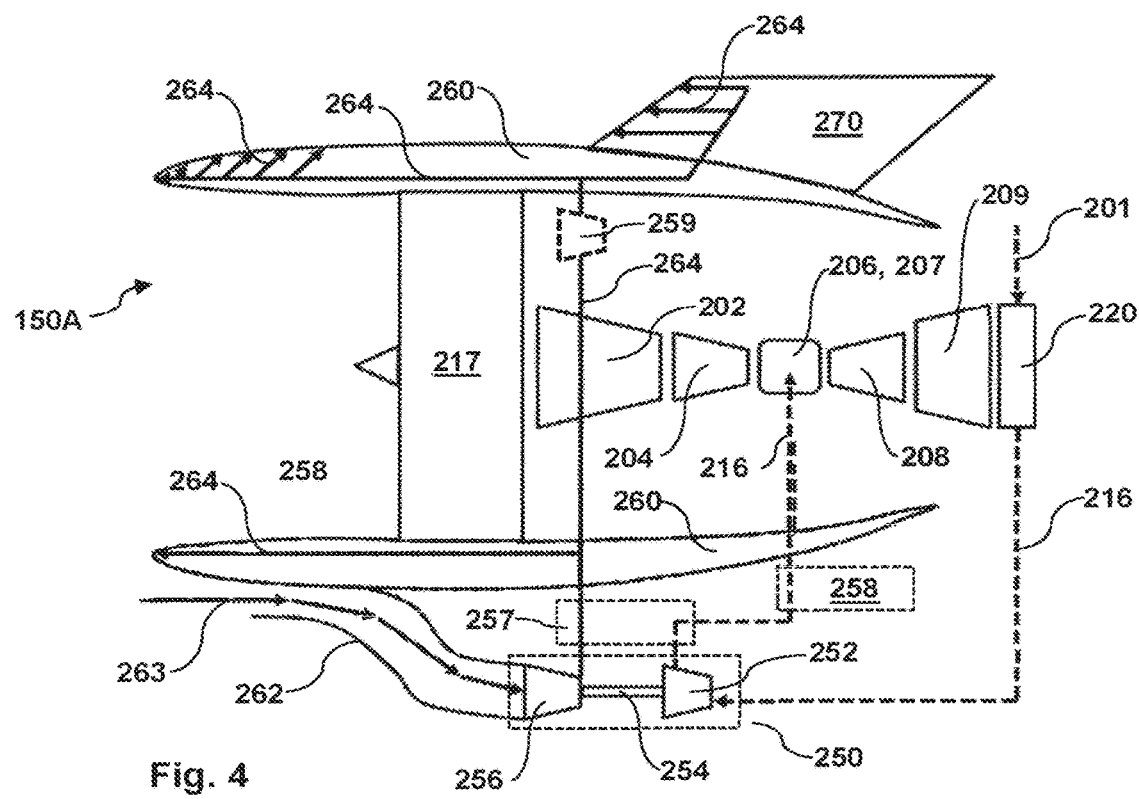
FIG. 4 shows the hydrogen-fuelled turbofan engine part of which is shown in FIG. 3.

Referring additionally to FIG. 4 the first turbofan engine 150A further comprises a fan case 217, a nacelle 260, air scoop 262 and air flow ducting 264. The engine 150A is mounted to the underside of wing 104A by a pylon 270. Optionally, the engine 150A may further include a heat exchanger 257 and/or a heat exchanger 258.

In operation of the aircraft 100, gaseous hydrogen is provided from the fuel system 120 to the fuel input 201 of the first turbofan engine 150A via the fuel supply network 128. The gaseous hydrogen input at the fuel input 201 may for example have a temperature of about −20° C. Heat from the gaseous combustion products output from the turbine section 208, 209 of the first turbofan engine 150A passes into the gaseous hydrogen passing through the recuperator 220, thus heating the gaseous hydrogen prior to input of the gaseous hydrogen to the fuelling system 206 and the combustor 207 via the fuel turbine 254. Ambient air 263 is collected and directed to the air compressor 256 of the fuel-to-air turbocharger 250 by the air scoop 262. Air flow ducting 264 provides air output from the air compressor 256 to the interiors of the nacelle 262 and the pylon 270; the air then exits the nacelle 262 and pylon 270 via apertures in their exterior surfaces, thus reduce the drag of the aircraft. The airflow ducting may additionally or alternatively provide air to the exterior surface of the fuselage 102 of the aircraft 100 for the same purpose. The air flow ducting 264 may be arranged to provide an air flow for boundary layer disruption at one or more surfaces of the aircraft 100.

The air flow ducting 264 may extend to wings 104A, 104B (or other parts) of the aircraft 100 to provide air flow to a surface for de-icing, for example wing de-icing. The ducting 264 may also provide air to a pneumatic system of the aircraft 100, for example to control variable stator vanes of the engine 150A, or to a pneumatic actuation system which replaces a conventional hydraulic actuation system. Air output by the air compressor 256 may also be used to provide air input for an environment control system (ECS) of the aircraft 100.

The air flow ducting 264 may include one or more air turbines, such as 259, at various locations on the aircraft 100, the air turbines extracting mechanical power from air output by the air compressor 256 for use in various applications.

The turbocharger 250 is largely self-controlling. For example, at maximum take-off (MTO) the power supplied to fuel turbine 256 of the turbocharger 250 will be at its operational maximum since the flow of hydrogen fuel into the combustor 207 and hence the heat captured by the recuperator 220 are also maximised. The mass flow rate of air to the air compressor 256 via the air scoop 262 is also maximised at MTO since at ground level the aircraft 100 operates with the densest ambient air encountered during a flight cycle. During cruise conditions, the fuel flow rate to the combustor 207 and the temperature of the core exhaust of the engine 150A are lower, and the relative speed of air entering the scoop 262, and its density, are also lower.

The heat exchanger 257, where present, transfers heat from air output by the air compressor 256 to the gaseous hydrogen fuel within the fuel line 216 prior to input of the fuel to the fuelling system 206 and combustor 207. In a case where the vaporiser 126 of the fuel system 120 produces heat, the heat exchanger 258 may be included to couple heat from the vaporiser into the gaseous hydrogen fuel prior to input thereof to the fuelling system 206 and combustor 207.

Figure 5:
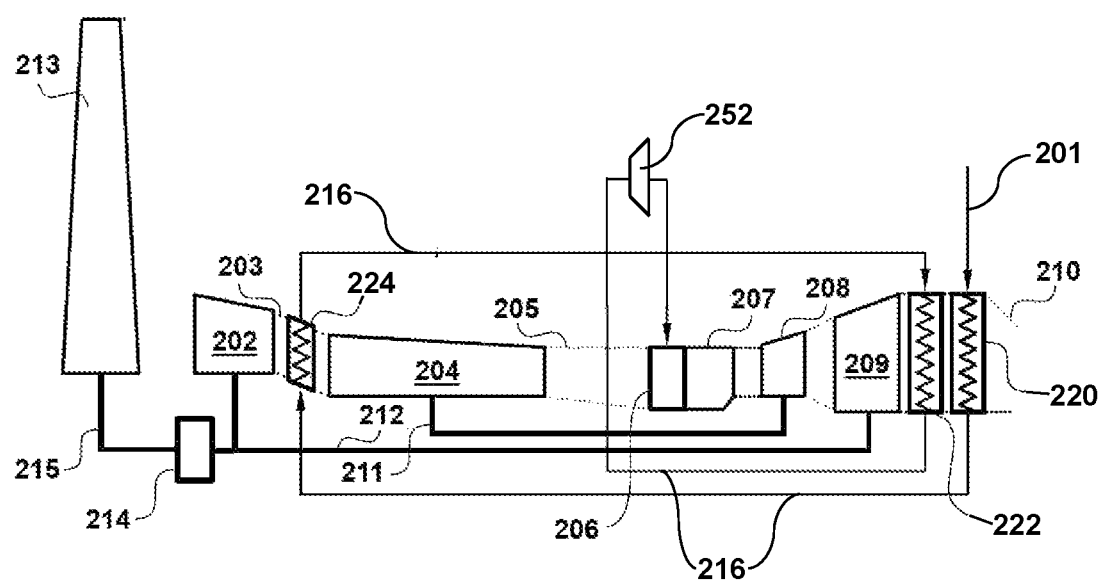
FIG. 5 shows an alternative to the arrangement of FIG. 3.

FIG. 5 shows an alternative to the FIG. 3 arrangement for the engine core and turbocharger of the engine 150A. In this case the fuel input path of the engine 150A defined by fuel line 216 from the fuel input 201 to the fuelling system 206 and combustor 207 additionally includes a heat-exchanger 224 and a second recuperator 222. In the fuel input path, the heat-exchanger 224 is located between the first and second recuperators 220, 222 and the fuel turbine 252 of the fuel-to-air turbocharger is located between the second recuperator 222 and the combustor 207. The heat exchanger 224 is physically disposed between the low- and high-pressure compressors 202, 204 of the turbofan engine 150A and the second recuperator 222 is physically disposed within the engine nozzle 210 between the exit of the turbine section 208, 209 of the engine 150A and the first recuperator 220. In operation of the engine 150A with the FIG. 5 arrangement, the first recuperator 220 receives less heat from the engine core of the engine 150A than does the second recuperator 222 and heats the gaseous hydrogen fuel within the fuel line 216 to a temperature below the discharge temperature of the low-pressure compressor 202. The heat exchanger 224 and the second recuperator 222 further heat gaseous hydrogen fuel within the fuel line 216 (fuel input path) prior to delivery thereof to the fuelling system 206 and combustor 207 via the fuel turbine 252. Where the FIG. 5 arrangement is employed, either or both of the heat exchangers 257, 258 may be included.

The invention claimed is:

1. An aircraft comprising a hydrogen-fuelled gas turbine engine having a fuel input path from a fuel input of the hydrogen-fuelled gas turbine engine to a combustor thereof, the hydrogen-fuelled gas turbine engine further comprising a heat-exchanger located in the fuel input path and a fuel turbine located in the fuel input path between the heat-exchanger and the combustor, wherein the heat-exchanger is arranged to receive waste heat from an engine core in order to heat hydrogen fuel introduced at the fuel input prior to input thereof to the combustor, the hydrogen-fuelled gas turbine engine further comprising an air compressor arranged to be driven by the fuel turbine,
wherein the hydrogen-fuelled gas turbine engine is arranged to provide at least one of propulsive thrust and lift to the aircraft, and wherein the aircraft further comprises air flow ducting arranged to deliver air output by the air compressor to one or more parts of the aircraft and an air scooping arrangement arranged to direct ambient air to the air compressor in operation of the aircraft.

2. The aircraft according to claim 1, where in the heat-exchanger is a recuperator arranged to receive combustion gases output from a turbine section of the hydrogen-fuelled gas turbine engine.

3. The aircraft according to claim 2, further comprising a second heat-exchanger located in the fuel input path between the recuperator and the fuel turbine, the second heat-exchanger being physically disposed between first and second compressor stages of the hydrogen-fuelled gas turbine engine, the first compressor stage being located upstream of the second compressor stage, and wherein the recuperator is arranged to heat the hydrogen fuel introduced at the fuel input to a temperature below a discharge temperature of the first compressor stage.

4. The aircraft according to claim 3, further comprising a third heat-exchanger, the third heat-exchanger being a second recuperator located in the fuel input path between the second heat-exchanger and the fuel turbine, the second recuperator being physically located between the turbine section of the hydrogen-fuelled gas turbine engine and the first recuperator and arranged to receive the combustion gases output from the turbine section of the hydrogen-fuelled gas turbine engine.

5. The aircraft according to claim 1, further comprising a second heat exchanger arranged to transfer heat from air output by the air compressor to gaseous hydrogen fuel introduced at the fuel input prior to input of the gaseous hydrogen fuel to the combustor.

6. The aircraft according to claim 1, wherein the hydrogen-fuelled gas turbine engine is a turbofan engine, a turboprop engine, a turboshaft engine or a turbojet engine.

7. The aircraft according to claim 1, wherein the air compressor is arranged to be driven by the fuel turbine via a shaft, the aircraft further comprising an electric generator arranged to be driven by the shaft.

8. The aircraft according to claim 1, wherein the airflow ducting is arranged to deliver the air output by the air compressor to one or more of an engine cowling, an engine nacelle, a pylon, a wing and a fuselage of the aircraft.

9. The aircraft according to claim 1, wherein the air flow ducting is arranged to provide air for boundary layer disruption at one or more surfaces of the aircraft.

10. The aircraft according to claim 1, wherein the air flow ducting is arranged to provide air for de-icing of one or more surfaces of the aircraft.

11. The aircraft according to claim 10, wherein the one or more surfaces of the aircraft comprises a wing surface of a wing of the aircraft.

12. The aircraft according to claim 1, further comprising an air turbine and wherein the air flow ducting is arranged to deliver the air output by the air compressor to the air turbine.

13. The aircraft according to claim 12, where a portion of the air flow ducting is arranged to deliver the air output from the air turbine to one or more systems of the aircraft requiring cooling during operation of the aircraft.

14. The aircraft according to claim 13, where the one or more systems of the aircraft requiring cooling during operation of the aircraft comprise at least one of an electronic system, an environmental control system, an actuation system, or an engine oil system of the aircraft.

15. The aircraft according to claim 1, where in the air flow ducting is arranged to deliver the air output from the air compressor to a pneumatic system of the aircraft.

16. The aircraft according to claim 15, wherein the pneumatic system is arranged to control variable stator vanes of the hydrogen-fuelled gas turbine engine.

17. The aircraft according to claim 1, wherein the air flow ducting is arranged to deliver the air output by the air compressor to at least one of an environmental control system of the aircraft and a cabin or cockpit of the aircraft to provide heat to the environmental control system, or to the cockpit or cabin.

18. The aircraft according to claim 1, further comprising a store of liquid hydrogen, a vaporiser arranged to vaporise liquid hydrogen from the store to produce gaseous hydrogen fuel for input to the fuel input of the hydrogen-fuelled gas turbine engine, wherein the aircraft further comprises a heat exchanger arranged to transfer heat from the vaporiser to the gaseous hydrogen fuel introduced at the fuel input prior to input of the gaseous hydrogen fuel to the combustor of the hydrogen-fuelled gas turbine engine.

* * * * *